United States Patent Office 3,808,159
Patented Apr. 30, 1974

3,808,159
FLAMEPROOF AND FIREPROOF RESINOUS FOAMS
Ralph Matalon, 432 Cherry Hill Blvd.,
Cherry Hill, N.J. 08034
No Drawing. Original application Oct. 6, 1971, Ser. No. 187,179. Divided and this application Jan. 22, 1973, Ser. No. 325,942
Int. Cl. C08g 22/16, 22/44
U.S. Cl. 260—2.5 AM        13 Claims

ABSTRACT OF THE DISCLOSURE

Flameproof and fireproof resinous foams are produced by reacting together the following admixed components: (1) the liquid polymeric product of a heated blend of a reducing sugar, phosphoric acid, one or more fluidifiers and, preferably, a polyhydric phenol having at least two hydroxy groups in a meta position; (2) at least one foaming, gelling and hardening agent, such as an organic polyisocyanate and/or a powder of a polyvalent metal above cadmium in the electromotive series; and, preferably, (3) an additional hardener, such as formaldehyde, furfuryl alcohol, or blends or polymers of furfuryl alcohol and formaldehyde.

---

This is a divisional of application Ser. No. 187,179, filed Oct. 6, 1971.

The present invention relates to flameproof and fireproof resinous foams and to processes for their preparation.

Foams have been produced heretofore by a variety of techniques, such as by means of chemical blowing agents, the release of gas under pressure and the beating of air into a foamable mass of an organic polymer, such as polyvinyl chloride, polyurethane and the like. However, such foams do not have the properties of being flameproof and fireproof.

It is, therefore, the principal object of the present invention to provide flameproof and fireproof resinous foams and to provide processes for their preparation.

The process of the invention for the preparation of a flameproof and fireproof resinous foam comprises reacting by mixing together the following components: (1) the liquid polymeric product of a heated blend of (a) a reducing sugar, (b) phosphoric acid, (c) at least one fluidifier and, preferably and optionally, (d) a polyhydric phenol having at least two hydroxy groups in a meta position; (2) at least one foaming, gelling and hardening agent, namely, (e) an organic polyisocyanate and/or (f) a powder of a polyvalent metal above cadmium in the electromotive series; and, preferably and optionally, (3) an additional hardener. The Component 2 is present in the reaction mixture in an amount sufficient to cause foaming, gelling and hardening thereof while the preferable and optional Component 3, when present, is present in the reaction mixture in an amount sufficient to cause additional hardening thereof. The amounts of Components 2 and 3 relative to the amount of Component 1 present in the reaction mixture will vary appreciably and are dependent primarily upon the chemical nature of these components, their reactivity and molecular weight. The weight ratio of Component 2 to Component 1 in the reaction mixture is generally from about 0.01:1 to about 1:1 and usually is from about 0.4:1 to about 1:1, while the weight ratio of Component 3 to Component 1, when Component 3 is present in the reaction mixture, is generally from about 0:1 to about 1:1.

The Component 1 of the reaction mixture is the liquid polymeric product (or resin former) of a heated blend of (a) from about 25% to about 80% by weight, and preferably from about 37% to about 78% by weight, of a reducing sugar, (b) from about 5% to about 62% by weight, and preferably from about 15% to about 35% by weight, of 85% strength phosphoric acid, (c) from about 2% to about 20% by weight, and preferably from about 4% to about 15% by weight, of at least one fluidifier, and (d) from about 0% to about 15% by weight, and preferably from about 3% to about 10% by weight, of a polyhydric phenol having at least two hydroxy groups in a meta position. Representative examples of disaccharides, such as dextrose and commercial glucose produced by hydrolysis of carbohydrates, fructose, galactose, mannose, lactose, maltose, and the like, and their blends with higher saccharides such as found in corn syrup, with dextrose being preferred. Cane sugar or sucrose, however, cannot be used because it is a non-reducing sugar. The phosphoric acid is generally of 85% strength, although lower strength phosphoric acid can be used, provided compensation is made by a reduction of the free water present in the reaction mixture when water serves as a fluidifier of the reaction mixture. Suitable fluidifiers include water and/or a dihydric or polyhydric lower aliphatic alcohol, such as ethylene glycol, propylene glycol, butylene glycol, diethylene glycol, glycerol, and the like. The preferred fluidifier is water. Useful polyhydric phenols having at least two hydroxy groups in a meta position include resorcinol, pyrogallol and phloroglucinol. The liquid polymeric Component 1 is described in my U.S. Pat. No. 3,551,365 (incorporated by reference herein) and is a reducing sugar copolymer or terpolymer containing chemically bound repeating acidic phosphate groups or units therein and repeating phenolic groups or units, when the phenolic reactant is used in its preparation.

The liquid polymeric Component 1 may be prepared by dissolving or dispersing the reducing sugar in the fluidifier, which generally is water. When the solution or dispersion is obtained, the polyhydric phenol, when used, is then added while stirring and this is followed by the addition of part or all of the phosphoric acid. The system is brought to the boil (or below the boil when heating under elevated pressure) and maintained at about 115° C.–130° C. for a period of 5 to 20 minutes or longer after which it is cooled to ambient temperatures with the further addition of any balance of the phosphoric acid. This system can be maintained at a higher temperature as the initial water content is reduced.

Representative examples of formulations used for preparing the liquid polymeric Component 1 by the above-described procedure are given in the following Table I and in Tables I and II of my U.S. Pat. No. 3,551,365 (incorporated by reference herein).

TABLE I

| Example number | Percent by weight |||||||||||||||||
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Components: | | | | | | | | | | | | | | | | | |
| Reducing sugar, e.g., dextrose or commercial glucose | 28 | 48.4 | 57 | 62 | 63.5 | 64 | 64 | 67 | 72 | 77 | 80 | 57 | 65 | 69 | 65 | 69 | 57 |
| Phosphoric acid (85%) | 62 | 42.1 | 31 | 26 | 24.5 | 23 | 24 | 20 | 15 | 10 | 5 | 27 | 19 | 15 | 20 | 28.5 | 25 |
| Water | 4 | 3.5 | 6 | 6 | 3 | 2 | 3 | 3 | 3.5 | 4 | 4.5 | 6 | 6 | 6 | | 2.5 | 6 |
| Ethylene glycol | | | | | 3 | 5 | 3 | 4 | 3.5 | 3 | 4.5 | | | | 9 | | |
| Polyhydric phenol, e.g., resorcinol | 6 | 6 | 6 | 6 | 6 | 6 | 6 | 6 | 6 | 6 | 6 | 10 | 10 | 10 | 6 | | 12 |

As noted above, the Component 2, i.e., a foaming, gelling and hardening agent, used in the process of the invention, is (e) an organic polyisocyanate and/or (f) a powder of a polyvalent metal above cadmium in the electromotive series. Suitable organic polyisocyanates include 3,3'-dimethyl-4,4'-biphenylene diisocyanate, 4,4'-diphenyl methane diisocyanate (MDI), 2,4-toluene diisocyanate (TDI), 4,4'-diphenyl diisocyanate, paraphenylene diisocyanate, hexamethylene diisocyanate, 4,4',4''-triisocyanato triphenyl methane, 1,3,5-triisocyanto benzene, 2,4,6-triisocyanato toluene, and the like. The powder of a polyvalent metal above cadmium in the electromotive series generally has a particle size ranging from about 100 mesh to about 400 mesh. Representative examples of suitable polyvalent metals include barium, calcium, magnesium, aluminum, manganese, zinc and iron. This Component 2 serves the plural functions of foaming, gelling and hardening the liquid polymeric product or Component 1 into a flameproof and fireproof resinous foam by reacting with the chemically bound acidic phosphate groups or units in the liquid polymer to liberate a gas (hydrogen or carbon dioxide) and to cross-link and harden the liquid polymeric product into a solid foam structure while preventing adverse foam collapse.

The Component 3, i.e., an additional hardener for increasing the rate and/or degree of gelation and hardening, usable in the process of the invention is furfuryl alcohol, formaldehyde or a blend or polymer of furfuryl alcohol and formaldehyde or other aldehydes, such as glyoxal or furfural.

The process of the invention is conducted by mixing together the requisite Components 1 and 2 with the optional, but preferred, Component 3. If desired, other optional compatible adjuvants can be present in the reaction mixture, such as colorants, fillers, volatile solvents, water repellents (e.g., urethane oils) metallic oxides, polyamides, polyamines, surfactants, carbonates, and the like. The reactants are mixed at a temperature from about 70° F. to about 200° F. at atmospheric pressure, although other equivalent correlated temperature and pressure conditions can be employed. The foaming, gelling and hardening of the reaction mixture occurs generally during a time interval of from about 2 to about 10 minutes or longer. The mixing of the reactants should be thorough to insure greater uniformity of cell structure in the foam product. The rate of the reaction and the extent of the expansion can be increased, where desired, by conducting the reaction at an elevated temperature and pressure. After the reaction has occurred and the foam product has gelled and hardened, it is permitted to cool to room temperature. In some instances, it may be desirable to further heat or bake the foam product at a temperature up to about 300° F. for up to about one hour to further expand the foam and to improve the thermal insulation properties thereof by removing the thermally conductive fluidifier Component c therefrom and to effect further cross-linking and hardening.

The resinous foam products of the invention are characterized by their flameproof and fireproof properties. The resinous foam products are generally of closed cell structure and vary in consistency from resilient foams to rigid foams having a wide range of tensile strength and compression resistance.

Flameproof and fireproof resinous foams were prepared following the above procedure by using the reaction mixtures described in Table II below.

TABLE II

| | Parts by weight | | | | | | | | | | | |
|---|---|---|---|---|---|---|---|---|---|---|---|---|
| Example number | 18 | 19 | 20 | 21 | 22 | 23 | 24 | 25 | 26 | 27 | 28 | 29 |
| Reactants: | | | | | | | | | | | | |
| Liquid polymeric product of Ex. 3 | | | 10 | 10 | 20 | | | | 10 | | | |
| Liquid polymeric product of Ex. 4 | | | | | | | | | | 10 | | |
| Liquid polymeric product of Ex. 7 | | 10 | | | | 20 | | | | | | 10 |
| Liquid polymeric product of Ex. 8 | | | | | | | 10 | | | | 10 | |
| Liquid polymeric product of Ex. 10 | 10 | | | | | | | | | | | |
| Liquid polymeric product of Ex. 16 | | | | | | | | 10 | | | | |
| Liquid polymeric product of Ex. 17 | | | | | | | | | | | | |
| MDI [1] | 1 | 1 | 1 | 1 | 4 | 4 | 2 | 2 | | 4 | | |
| Aluminum powder | | | | | | | 0.1 | | | | | 0.2 |
| Magnesium powder | | | | | | | | | | | | |
| Iron powder | | | | | 2.5 | | | | | | 1 | |
| Manganese powder | | | | | | | | | | | | |
| Zinc powder | | | | 1 | | | | | 1 | | | |
| Polyamide (Versamid 125) | | | | | | | | 0.2 | | | | |
| Zinc oxide | | | | | 1 | | | | | | | |
| Aluminum oxide | | | | | | | | | 1 | | | |
| Magnesium oxide | | | | | | | | 0.2 | | | | |
| Furfuryl alcohol | | | | | 2 | 2 | | | 2 | | | |
| Paraformaldehyde | | | | | | | | | | | | |
| Furfuryl alcohol-formaldehyde blend (64%/36%) | | | | | | | | | | | | |
| Furfuryl alcohol-formaldehyde polymer (84%/16%) | | | | | | | | | | | | |

| | Parts by weight | | | | | | | | | | | |
|---|---|---|---|---|---|---|---|---|---|---|---|---|
| Example number | 30 | 31 | 32 | 33 | 34 | 35 | 36 | 37 | 38 | 39 | 40 | 41 |
| Reactants: | | | | | | | | | | | | |
| Liquid polymeric product of Ex. 3 | 10 | 10 | 10 | | | | | | | | | |
| Liquid polymeric product of Ex. 4 | | | | | | | | | | | | 10 |
| Liquid polymeric product of Ex. 7 | | | | | | | | | | | 10 | |
| Liquid polymeric product of Ex. 8 | | | | | | | | | | | | |
| Liquid polymeric product of Ex. 10 | | | | | | | | | | | | |
| Liquid polymeric product of Ex. 16 | | | | | | | | | | 10 | | |
| Liquid polymeric product of Ex. 17 | | | | 10 | 10 | 10 | 10 | 10 | 10 | | | |
| MDI [1] | | | | | | | | | | | | |
| Aluminum powder | 0.3 | 0.3 | | 0.2 | | | | | | | | 0.1 |
| Magnesium powder | | | | | 0.5 | | | | | | | |
| Iron powder | 2.5 | | 1 | | | 1 | | | 1 | 1 | 1 | |
| Manganese powder | | | | | | | 1 | | | | | |
| Zinc powder | | | 3 | | | | | 1 | | | | |
| Polyamide (Versamid 125) | | | | | | | | | | | | |
| Zinc oxide | | | | | | | | | | | | |
| Aluminum oxide | | | | | | | | | | | | |
| Magnesium oxide | | | | | 0.5 | | | | | | | |
| Furfuryl alcohol | | | | | | | | | | | | |
| Paraformaldehyde | | | | | 1 | 1 | 1 | 1 | 1 | 1 | | |
| Furfuryl alcohol-formaldehyde blend (64%/36%) | | | | | | | | | | | 1 | 1 |
| Furfuryl alcohol-formaldehyde polymer (84%/16%) | | | | | | | | | | | | 5 |

[1] tMDI is 4,4'-diphenyl methane diisocyanate. The pure form was used in Example 24, whereas crude MDI (Mondur MR) also containing a triisocyanate was used in Examples 18-23, 25 and 27.

The resinous foams produced from the reaction mixtures described in Table II above were flameproof and fireproof and exhibited low smoke evolution or smoke density and low weight loss upon the heating thereof. They varied in consistency from resilient foams to rigid foams having variable tensile strength and compression resistance.

The resinous foams of the invention are particularly useful in the formation of products where flameproof and fireproof or thermal insulation properties are desirable, such as, in materials of construction used in buildings, furniture, automobiles and aircraft, and also in products where ablation resistance is desirable, such as in missile nose cones, and in coating applications.

It will be appreciated that various modifications and changes may be made in the process and product of the invention in addition to those mentioned above by those skilled in the art without departing from the essence of the invention and that accordingly the invention is to be limited only within the scope of the appended claims.

What is claimed is:

1. A process for the preparation of a flameproof and fireproof resinous foam which comprises reacting by mixing together at a temperature from about 70° F. to about 200° F. the following components:
   (1) the liquid polymeric product of a heated blend of
      (a) from about 25% to about 80% by weight of a reducing sugar,
      (b) from about 5% to about 62% by weight of 85% strength phosphoric acid,
      (c) from about 2% to about 20% by weight of at least one fluidifier selected from the class consisting of water and dihydric and polyhydric lower aliphatic alcohols, and
      (d) from about 0% to about 15% by weight of a polyhydric phenol having at least two hydroxy groups in a meta position selected from the class consisting of resorcinol, pyrogallol and phloroglucinol; and
   (2) at least one foaming, gelling and hardening agent which is an organic polyisocyanate;
the Component 2 being present in the reaction mixture in an amount sufficient to cause foaming, gelling and hardening thereof.

2. The process as defined by claim 1 wherein the reaction mixture further contains the following component:
   (3) an additional hardener selected from the class consisting of a furfuryl alcohol, formaldehyde, a blend of furfuryl alcohol and an aldehyde, and a furfuryl alcohol-aldehyde polymer;
the Component 3 being present in the reaction mixture in an amount sufficient to cause additional hardening thereof.

3. The process of as defined by claim 1 wherein the weight ratio of Component 2 to Component 1 is from about 0.01:1 to about 1:1.

4. The process as defined by claim 1 wherein the weight ratio of Component 2 to Component 1 is from about 0.4:1 to about 1:1.

5. The process as defined by claim 2 wherein the weight ratio of Component 3 to Component 1 is from about 0:1 to about 1:1.

6. The process as defined by claim 1 wherein Component 1 is the liquid polymeric product of a heated blend of
   (a) from about 37% to about 78% by weight of a reducing sugar,
   (b) from about 15% to about 35% by weight of 85% strength phosphoric acid,
   (c) from about 4% to about 15% by weight of at least one fluidifier selected from the class consisting of water and dihydric and polyhydric lower aliphatic alcohols, and
   (d) from about 3% to about 10% by weght of a polyhydric phenol having at least two hydroxy groups in a meta position selected from the class consisting of resorcinol, pyrogallol and phloroglucinol.

7. The process as defined by claim 4 wherein Component 2 contains 4,4′-diphenyl methane diisocyanate.

8. The process as defined by claim 5 wherein Component 3 is furfuryl alcohol.

9. The process as defined by claim 5 wherein Component 3 is formaldehyde.

10. The process as defined by claim 1 wherein the foam is subsequently heated at a temperature up to about 300° F. for up to about one hour.

11. The flameproof and fireproof resinous foam produced by the process defined by claim 1.

12. The flameproof and fireproof resinous foam produced by the process defined by claim 2.

13. The flameproof and fireproof resinous foam produced by the process defined by claim 10.

References Cited
UNITED STATES PATENTS

| | | | |
|---|---|---|---|
| 3,551,365 | 12/1970 | Matalon | 260—17.2 |
| 3,741,919 | 6/1973 | Lewis | 260—2.5 AR |
| 3,737,397 | 6/1973 | Baranauckas | 260—2.5 AR |
| 3,509,076 | 4/1970 | Anderson | 260—2.5 AJ |

DONALD E. CZAJA, Primary Examiner

C. W. IVY, Assistant Examiner

U.S. Cl. X.R.

260—2.5 AJ

PO-1050 (5/69)

UNITED STATES PATENT OFFICE
CERTIFICATE OF CORRECTION

Patent No. 3,808,159    Dated April 30, 1974

Inventor(s) Ralph Matalon

It is certified that error appears in the above-identified patent and that said Letters Patent are hereby corrected as shown below:

Column 2, lines 19 and 20, after "Representative examples of" and before "disaccharides" insert -- suitable reducing sugars include monosaccharides and --. Column 3, line 10, "1,3,5-triisocyanto" should be -- 1,3,5-triisocyanato --. Columns 3 and 4, bottom of Table II, first line of footnote, "$^1$tMDI" should be --$^1$MDI --; bottom of Table II, lines 1 and 2 of footnote, "triisocyanae" should be -- triisocyanate --. Column 6, line 1, delete "of".

Signed and sealed this 24th day of September 1974.

(SEAL)
Attest:

McCOY M. GIBSON JR.
Attesting Officer

C. MARSHALL DANN
Commissioner of Patents